United States Patent [19]

Bjorke

[11] Patent Number: 4,816,834
[45] Date of Patent: Mar. 28, 1989

[54] PULSE SYNCHRONIZING APPARATUS

[75] Inventor: Merlin D. Bjorke, Minneapolis, Minn.

[73] Assignee: Honeywell Inc., Minneapolis, Minn.

[21] Appl. No.: 188,106

[22] Filed: Apr. 27, 1988

Related U.S. Application Data

[63] Continuation of Ser. No. 595,090, Mar. 30, 1984.

[51] Int. Cl.[4] .............................................. G01S 13/08
[52] U.S. Cl. ..................................... 342/120; 342/195
[58] Field of Search ............... 343/5 DP, 7 PL, 12 A, 343/12 R; 375/111, 119–120, 109, 110; 370/108; 342/118, 120, 121, 127, 134, 135, 145, 189, 195

[56] References Cited

U.S. PATENT DOCUMENTS

| | | | |
|---|---|---|---|
| 2,768,372 | 10/1956 | Green | 343/12 R |
| 3,221,298 | 11/1965 | Burns | 367/189 |
| 3,328,796 | 6/1967 | Follen et al. | 343/7.3 |
| 3,396,392 | 8/1968 | Fishbein et al. | 343/14 |
| 3,447,155 | 5/1969 | Webb | 342/102 |
| 3,453,592 | 7/1969 | Ishii et al. | 375/109 X |
| 3,597,547 | 8/1971 | Ericsson | 370/106 |
| 3,668,315 | 6/1972 | Heitzman | 375/119 |
| 3,721,981 | 3/1973 | Allard et al. | 342/135 |
| 3,727,222 | 4/1973 | Hollis | 343/7.5 |
| 3,766,555 | 10/1973 | Watt | 343/14 |
| 3,774,206 | 11/1973 | Rauch | 342/89 |
| 3,778,159 | 12/1973 | Hines et al. | 343/12 R |
| 3,868,686 | 2/1975 | Magorian | 343/7 A |
| 3,900,261 | 8/1975 | Wingate | 356/5 |
| 3,900,850 | 8/1975 | Ulman et al. | 342/97 |
| 3,934,253 | 1/1976 | Wiedemann et al. | 342/134 |
| 4,053,888 | 10/1977 | Robin et al. | 342/89 |
| 4,186,397 | 1/1980 | Sternberger et al. | 343/14 X |
| 4,219,818 | 8/1980 | Mansur, Jr. | 342/203 |
| 4,241,347 | 12/1980 | Albariese et al. | 343/5 PN |
| 4,328,495 | 5/1982 | Thue | 343/17.2 PC |
| 4,359,770 | 11/1982 | Suzuka | 370/108 |
| 4,370,653 | 1/1983 | Crowley | 343/7 PL |
| 4,535,461 | 5/1985 | Stepp et al. | 375/110 |

FOREIGN PATENT DOCUMENTS

| | | |
|---|---|---|
| 2106967 | 4/1972 | France . |
| 2106966 | 4/1972 | France . |
| 0956155 | 4/1964 | United Kingdom . |
| 1073024 | 7/1967 | United Kingdom . |
| 1351096 | 4/1974 | United Kingdom . |

OTHER PUBLICATIONS

"Introduction to Radar Systems", Merrill I. Skolnik, McGraw-Hill Book Co., 1962.

Primary Examiner—Theodore M. Blum
Assistant Examiner—Bernarr Earl Gregory
Attorney, Agent, or Firm—Robert A. Pajak

[57] ABSTRACT

Disclosed is a radar apparatus including the circuitry for synchronizing a first and second pulse train, having the same pseudo random coding. The apparatus comprises a programmable delay responsive to a control signal for selectively advancing and retarding a pulse train by monotonic increments. A positive and negative range gate is utilized in passing the video signals in opposite senses in order to generate a command signal for bringing the pulse trains in synchronization.

14 Claims, 3 Drawing Sheets

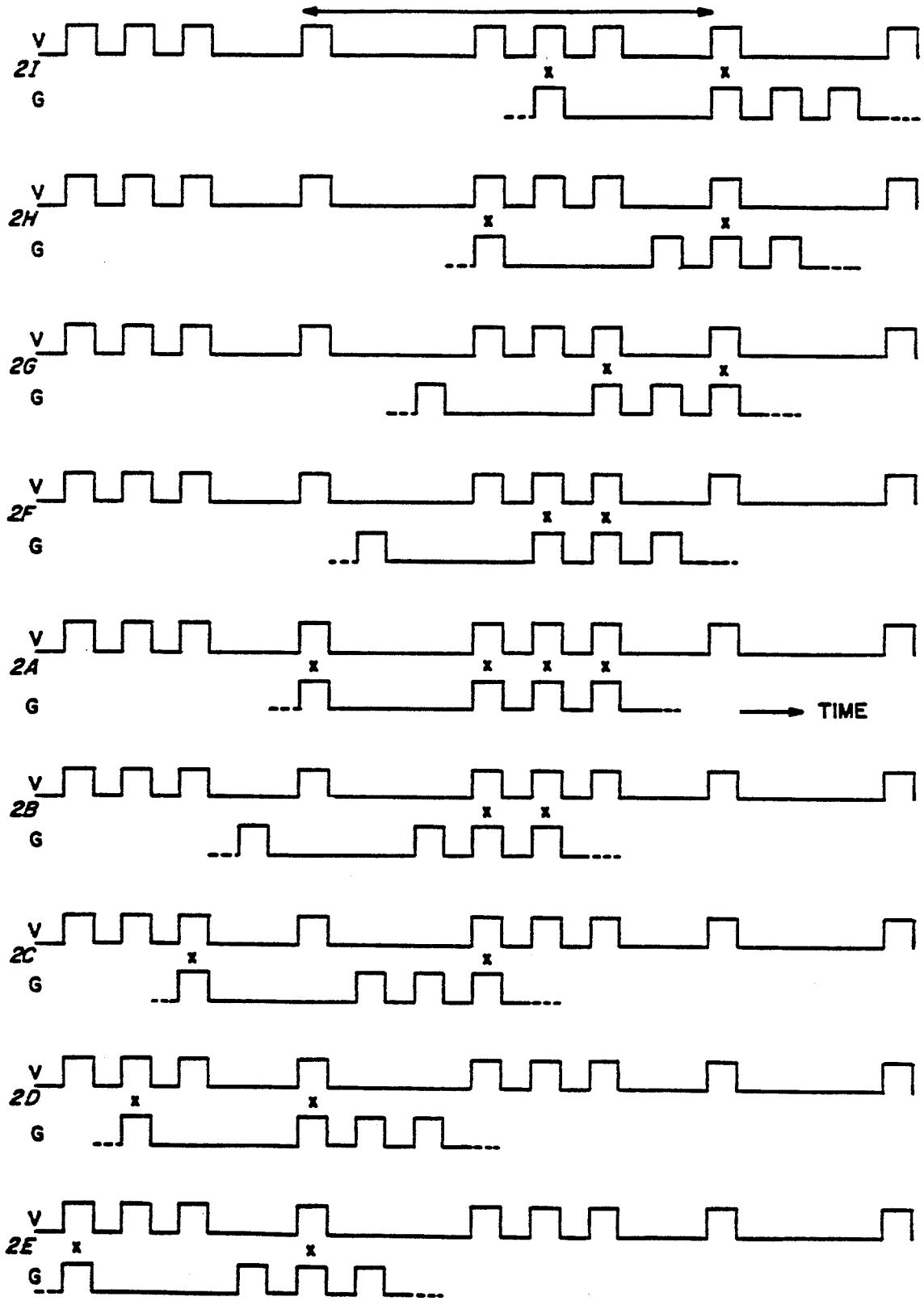

PULSE SYNCHRONIZING APPARATUS

This application is a continuation, of application Ser. No. 595,090, filed Mar. 30, 1984.

FIELD OF THE INVENTION

This invention relates to radar distance measuring devices, and particularly pulse position coded radar altimeters.

BACKGROUND OF THE INVENTION

Pulsed radar systems have conventionally operated with a relatively low transmitter duty cycle determined by the maximum range to the target. As a result, the peak power required for the transmitter in order to obtain sufficient signal-to-noise ratio is high.

The duty cycle can be increased by increasing the pulse repetition frequency. This results in having several pulses in flight at the same time. In these circumstances, an apparatus must be provided for overcoming the ambiguous range problem due to multiple pulses in flight. For non-coherent radars, this commonly takes the form of random pulse position frequency jitter, which is effective for relatively small duty cycle improvement but degrades rapidly with increase in duty cycle.

Increasing pulse repetition frequency and overcoming ambiguity may be accomplished by encoding an RF pulse train which in turn will permit increasing the altimeter pulse repetition frequency by at least a factor of ten. This in turn will yield a corresponding increase in system loop sensitivity. Previous pulsed altimeter concepts require that the system wait for the ground echo from a given transmitted pulse to be received back at the receiver before transmitting another pulse. Doing so prevented the possibility of false "lock-on". Suitable encoding of a transmitted pulse sequence, and the corresponding receiver correlation of that code sequence, will permit many pulses to be in route to the ground and back at the same time. This increases the potential total average RF energy on the target, and improves sensitivity (particularly at high altitudes, where the "wait time" would previously have been relatively long). The transmitter pulse separation in these circumstances is now limited only by "pulse spreading" on the ground within the antenna beamwidth, and the codes ambiguous range rejection capabilities.

Heretofor, unresolved coding problem was not in generating the code but in the establishing of a simple method of variably delaying a complete code word in time (as opposed to a single pulse), relative to its origin, with virtually infinite resolution and over a wide range of delay times.

BRIEF SUMMARY OF THE INVENTION

The present invention makes use of pulse position coding and pulsed radar signals to enable a high duty cycle radar system without ambiguity signal degradation, and provide highly suppressed incidental or intentional interference.

A pulse synchronizing apparatus utilizes a programmable delay means for generating a pulse train derived from a high frequency clock. The programmable delay means being responsive to a command signal for monotonically advancing or retarding the pulse train relative to the high frequency clock in accordance with the command signal.

When employed in a radar altimeter, a received pulse train, sometimes referred to as the video signal, is compared with a pulse train having substantially the same characteristic in code as the video signal but which is forceably delayed in time so as to be synchronized with the video signal. An output indicative of the comparator may be integrated so as to provide control of the programmable delay line to appropriately advance or retard the signal. When synchronization occurs, a stop pulse is provided to a timer such that the timer output is indicative of the range from the radar to the target.

A BRIEF DESCRIPTION OF THE DRAWINGS

FIG. 2 is a schematic diagram showing certain relationships between returned video pulses and local gating pulses in predetermined conditions.

DESCRIPTION OF THE PREFERRED EMBODIMENT

Figure 1:
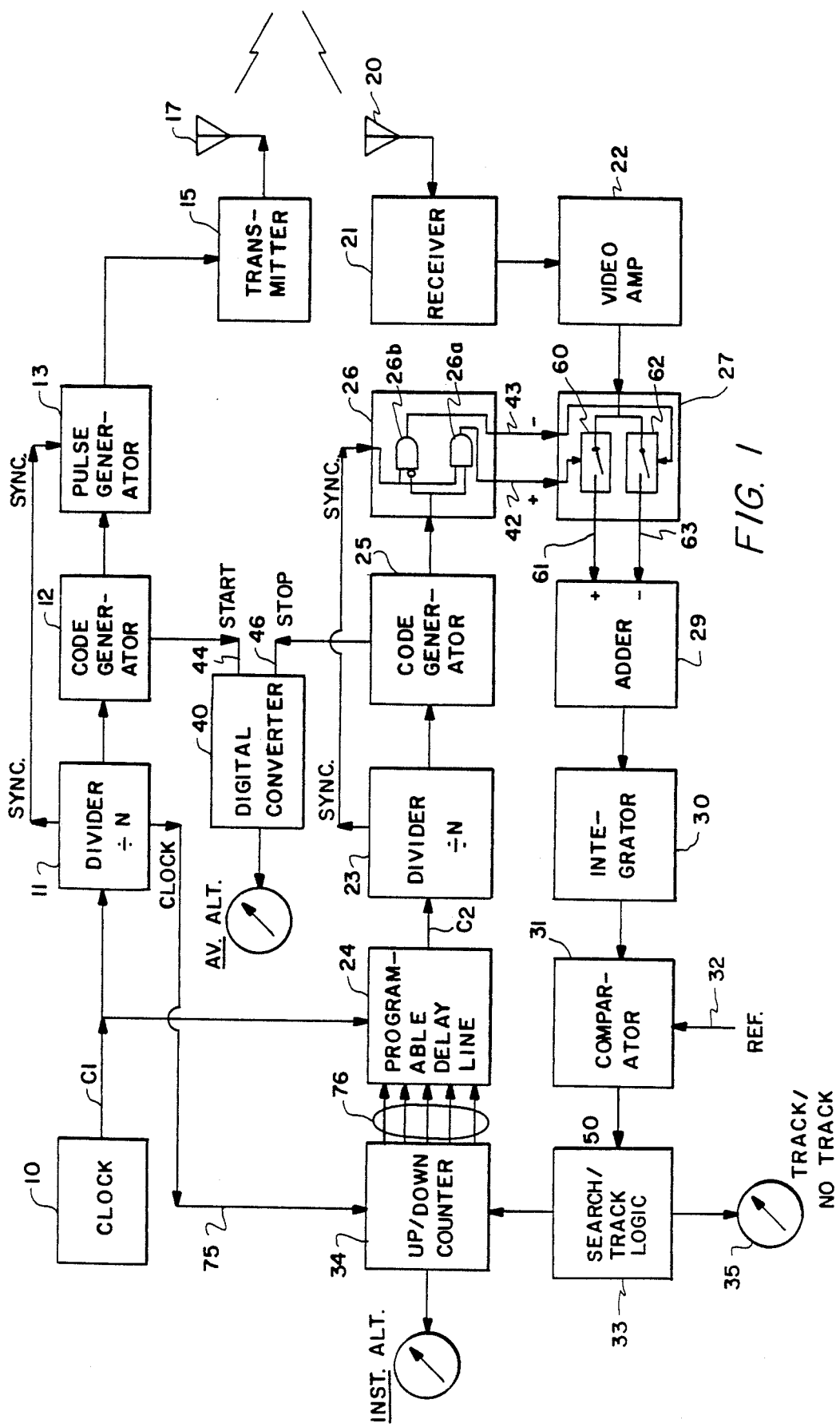
FIG. 1 is a blocked diagram of a pulse radar altimeter employing the principles of the invention.

The synchronization apparatus of the present invention will be described as utilized in a radar altimeter to facilitate understanding. In the blocked diagram of FIG. 1, a clock 10 supplies a continuous train of equally spaced pulses at a fixed pulse repetition frequency thereby establishing a first clock signal C1. In turn the first clock signal C1 is fed through a divider 11 which divides the first clock signal by an integer "N" thereby providing a first pulse train. A code generator 12 operates on the first pulse train to derive therefrom a second pulse train having a repetitive pulse code which in turn triggers a pulse generator 13. The output of pulse generator 13 is a sequence of sharp pulses, defined by the second pulse code of the second pulse train, applied to transmitter 15. Transmitter 15 transmits a burst of RF signal through antenna 17 initiated by occurrences of one of the two states of the second pulse train. Each repetition of the pulse code defines a word in a well known manner. Each burst of RF signal is herein referred to as RF pulses as is customary. The RF pulses may be either coherent or non-coherent in practicing the present invention.

In the radar altimeter illustrated in FIG. 1, the output of transmitting antenna 17 is a repetitive word of RF pulses. The repeating word of RF pulses is radiated from the transmitting antenna 17 and reflected from ground, or other target, to a receiving antenna 20 and a receiver 21. Receiver 21 produces a signal which is commonly referred to as a video signal. The video signal generally refers to a signal after envelope or phase detection and contains signal and noise which is picked up by antenna 17 and detected/demodulated by receiver 21. The output of receiver 21 is amplified by a video amplifier 22. The output of video amplifier 22 is a repetitive train of pulses of video signal delayed in time relative to the output pulse train of generator 13—dictated by the second pulse code as aforesaid. The time interval difference between the video pulse train and the transmitted pulse train is a measure of the distance to the reflecting target. Antenna 17 and 20 may be a single antenna which is fed from a duplexer well known in the art.

The output pulses from the video amplifier 22 will be subsequently integrated by integrator 30 through adder 29 and gating circuit 27, both of which will subsequently be described. The output of the integrator 30 is presented to comparator 31 having an output which is presented as a decision control signal 50. The output of comparator 31 is also presented to a search-and-track logic 33 which has an output presented to a track/non-track indicator 35.

As illustrated in FIG. 1, first clock signal C1 is presented to a second divider 23 through a programmable delay means 24. The output of programmable delay means 24, shown as a programmable delay line, is a second clock signal C2 which is substantially identical to first clock signal C1 but which is delayed with respect to the first clock signal. In turn the second clock signal C2 is passed through a second divider 23 which divides the second clock signal by the same factor "N" thereby providing a third pulse train. The third pulse train is passed through a second code generator 25 substantially identical to code generator 12 for providing a fourth pulse train having a repetitive code identical to the second pulse train at the output of code generator 12 but which is delayed in time.

Programmable delay line 24, as illustrated in FIG. 1, produces a delay in accordance with a command signal 76 provided by the digital output lines of up/down counter 34, hereafter counter 34. Counter 34 counts clock signals 75, dependent upon decision control signal 50 as will be subsequently described.

The total delay provided between the second clock signal and the first clock signal should be between none and exactly the same length as the period of the clock signal passing through it—that is, a sum of an integral number of successive or monotonic increments of delay should be equal to the period of clock signal C1. Counter 34 is usually clocked by clock signal 75 at a very much slower rate than a signal passing through the delay line, so that the delay through the delay means will only monotonically change one increment for each clock signal presented at input 75. The combination of programmable delay line 24 and counter 34 is such that when the maximum delay of the delay line is reached after successive step changes provided by counter 34, the delay automatically is switched to the other end of the delay line and the sequence continues over again in exactly the same fashion as the "roll-over" in an up/down counter when it overflows or underflows. The result is that for a continuous shift of the delay line in one direction, a complete cycle of incoming clock signal from clock 10 is skipped or added every time the phase delay line control counter "rolls-over".

In FIG. 1, divider 11 may be a simple digital divider and includes output taps for having other division factors. Therefore clock signal 75 may be picked up off a tap of divider 11 as illustrated. Doing so synchronizes clock 75 with clock signal C1, although this may not be necessary.

The small increment phase shifting technique just described, functions similarly to that of a single-side band, suppress carrier modulator. The net result is that the average output frequency from the phase shifter is different from that of the master clock by the rate at which the shifter is driven through 360 degree clock shifts. This is the unique frequency controlling mechanism that effectively increases or decreases the average third pulse train frequency (in very small increments) presented to code generator 25 and in turn to gate generator 26 as will be further described.

Consider a situation where the first clock signal provided by clock 10 is chosen to have a period equal to the propagation time of 16 radar feet (approximately 31 MHz). This choice allows the phase shifting mechanism for the second programming delay means 24 to be a 4-bit, digitally controlled device for one-foot shift increments. Other specific combinations of clock frequency and shift increments may be more convenient for some applications. A programmable delay line rather than a discreet component phase shifter or shift register is economically desireable.

In FIG. 1 the command signal 76 to the programmable delay line is driven by a 4-bit up/down counter 34 that is clocked at a rate equal to the maximum search or track rate requirement of the altimeter. This is determined by clock signal 75. This follows because we chose one-foot increments for each shift. Other compatible combinations can be used depending upon requirements. For example, a 2000-cycle-per-second clock rate 75 will yield a 2000-foot-per-second gate shift rate capability. The "up/down" control decision signal 50 presented to the up/down counter 34 comes from a high speed comparator 31 that compares the gated and integrated "range error" signal from integrator 30 with that of a fixed reference voltage to close the track loop, as in conventional altimeters. The normal AGC and search-track functions are also mechanised as they are in conventional altimeters.

If the up/down counter is expanded to 16 bits, using the first 4 bits to drive the programmable delay line 24, a 16-bit digital altitude signal can be extracted directly from this counter for specific applications. Nevertheless, for ease and adjustment for "zero-foot" installation delays as required in most aircraft, average digital altitude output information is derived from a conventional time-to-digital converter 40 that gets its "start" pulse from code word generator 12 and its "stop" pulses from code word generator 25 indicated by outputs 44 and 46 respectively. The output of digital converter 40 is therefore indicative of the altitude. Of course, this is only the situation when the system is in a "track" condition.

Gate generator 26 is diagrammatically shown as a pair of AND gates 26a and 26b each having as a first input a short gate or SYNC pulse provided by divider chain 23. AND gate 26a has as a second input, the output of code generator 25. Therefore gate 26a provides pulses 42 only when the coded pulse train provides a logical "one" or positive signals applied thereto concurrently with a SYNC pulse. Similarly, AND gate 26b has an second input the inverted output of code generator 25. Therefore gate 26b provides pulses 43 only when the coded pulse train provides a logical "zero" or negative signals.

Gating circuit 27 is diagrammatically shown as gated switch 60 controlled by the output of gate generator 26a indicated by numeral 42 for passing the output of video amplifier 22 therethrough on signal line 61. Circuit 27 further includes gated switch 62 controlled by the output of gate generator 26b indicated by numeral 43 for passing the output of video amplifier 22 therethrough on signal line 63. Signal lines 61 and 63 are preented to the positive and negative inputs of adder 29. Since gate 26a and 26b cannot be simultaneously on, gates 60 and 62 cannot be simultaneously on. Therefore, video pulses from video amp 22 are presented to integrator 29 in a "positive" sense when switch 60 is closed, and are presented to integrator 29 in a "negative" or inverted sense when switch 62 is closed.

The combination of gate generator 26 and 27 functions as follows. If the delay between the second and fourth pulse trains provided by generators 12 and 25 is exactly the same as the time required for each successive pulse to be transmitted, reflected from the ground, and received, so that the first return or video pulse of each repetitive code word is synchronized with a first gating pulse of the word, then every video pulse in the word is synchronized with a gating pulse, and a maximum signal is supplied to the integrator 30 through conductor 63, the positive input to ADDER 29. In these circumstances the output of the integrator 30 will be sufficiently greater than the reference signal input 32 presented to comparator 31. Accordingly, comparator 31 provides a voltage signal 50 so as to prevent counter 34 from counting. In these circumstances the delay provided by the delay means 24 remains constant thereby maintaining the output pulse train from code generator 25 to be exactly in sync with the received radar pulses.

However, if the delay is such that the first video pulse is synchronized with some gating pulse other than the first one of the word, some of the other video pulses will not be synchronized with any gating pulse, and the integrator receives a smaller signal. The output 50 of comparator 32 indicates such a condition and allows counter 34 to begin counting and monotonically changing the digital signal output presented to programmable delay means 24 so as to further delay the pulse train provided by code generator 25 until synchronization is obtained as aforesaid.

Through the frequency controlling mechanism of the present invention, all of the gates provided by gate generator 26 move inbound or outbound relative to the video pulses derived from the received transmitter pulses by virtue of clock signal C2 being advanced or retarded. This has the effect of changing the "gate clock" frequency of the pulse train output of divider 23. As the "gate clock" frequency is increased, the gates will move inbound. As the frequency is decreased, the gates will move outbound. If the frequency is not shifted, the gates will remain stationary relative to the transmitted pulses provided by divider 11.

Note that if the code generator (12 and 25) is random, the number of video pulses applied to gates 26a and 26b are within one of each other. Therefore, if there is no tracking whatsoever, i.e., the video pulse train does not match the output of code generator 25, and equal number of the video pulses will be presented to integrator 30 in a positive and negative sense. This will result in the decision control signal 50 to be near zero in value causing the counter 34 to retard the pulse code produced by code generator to a track condition. Also, since integrator 30 integrates the positive and DC inverted VIDEO pulses, the integrator 30 output due to noise components on the VIDEO signals for each word in near zero. Thus the integrator output is indicative of virtually only the contribution of video signals which match code pulses. This will be further described. This circuit combination as described provides highly suppressed interference, ground clutter, and false signals.

FIGS. 2A–2I illustrate the operation of the system for a simple case of a "7-bit" word, one with seven pulse positions. FIG. 2a shows the gating word pulses "G", such as those provided by gate 26a, properly synchronized with the return video pulses "V". FIGS. 2B, 2C, 2D and 2E show the gating word successively 1, 2, 3 and 4 pulse positions too early, and FIGS. 2F, 2G, 2H and 2I show the gating word successively 1, 2, 3 and 4 pulse positions too late. Note that in FIG. 2A four pulses per video word, those marked with x, coincide with gating pulses, while each of FIGS. 2B and 2I only two pulses per video word coincide with gating pulses. Thus, for even this short word, an integrator 30 output corresponding to three or fewer coincident pulses is indicative that synchronization is not properly complete. For words with a greater number of bits, the output signal difference between correctly and incorrectly synchronized signals is even greater.

Figure 3A:
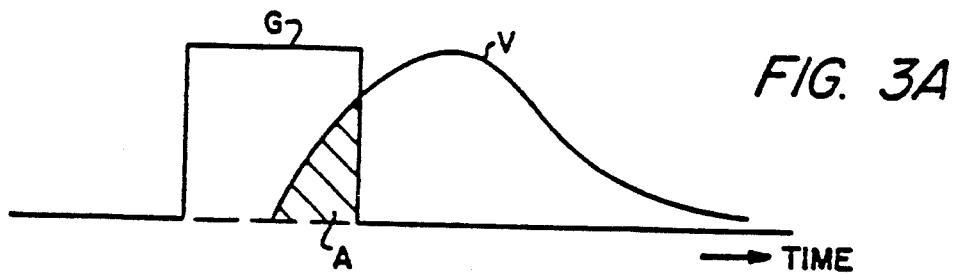
FIG. 3 is a graphical representation showing certain relationships between individual video signals and gating pulses.
Figure 3B:
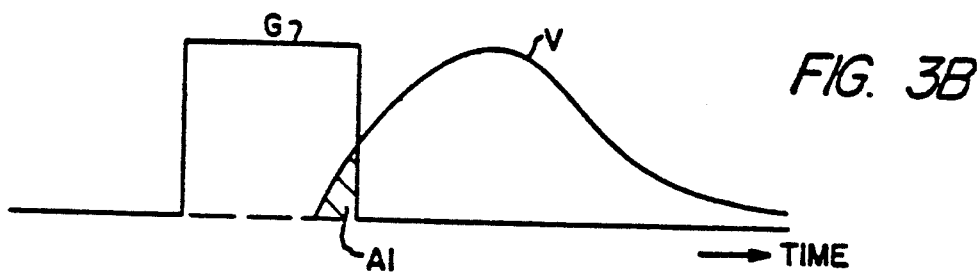
Figure 3C:
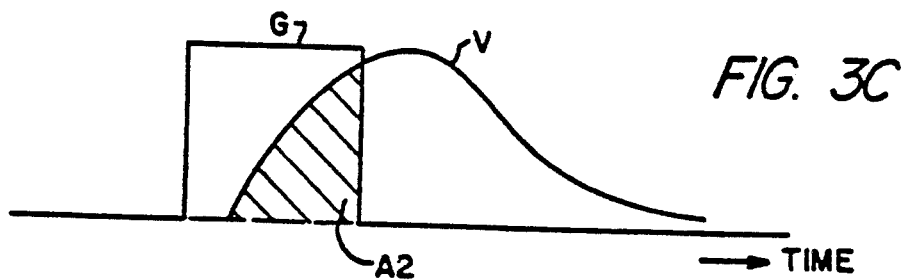

In FIGS. 2A–2I both the video pulses nd the gating pulses are shown to be of square wave form—this is not generally the case in practice. The gate pulses can be substantially square, but the video pulses are unavoidably degraded. FIG. 3 shows a wave form closer to what can be expected. Here curve G shows a gating pulse, and curve V shows the associated video pulse. The electronics are set up so that when the curves intersect to the finest specific area A, comparator 31 gives a zero output and counter 34 is not accuated. If the area reduces to that indicated by $A_1$ in FIG. 3b, counter 34 is accuated step-wise to cause gate pulse G to occur later, while if the area increases to that indicated by $A_2$ in FIG. 3c counter 34 is accuated step-wise to cause pulse G to occur earlier. This result repeating in each case until area A is again achieved. Note that only when proper synchronization has been achieved does a maximum number of such instances take place.

The operation of the system is as follows. Under the control of clock 10 and code generator 12, a continual sequence of pulses with PRN coding is transmitted from antenna 17, and a like sequence of coded pulses is supplied to gate generator 26 after delay in line 24. Return pulses from antenna 20 cause the video pulses presented to gating circuit 27. When the system is in a search mode, the inegrator 30 output is low causing counter 34 to step through its range repeatedly for each clock input signal 75 in a predetermined direction. At some point in the sweep the gating pulses come into appropriate synchronism with the return pulses, to the extent that each gating pulse overlaps the video pulse. A signal of sufficient magnitude is strongly supplied through integrator 30 to change logic 33 from its search state to its track status as indicated at 35. In the track mode, if the video pulses and the gate pulses overlap by an area A, the integrater signal to comparator 31 is equal to the reference 32, and the comparator gives no output, so that logic 33, counter 34 and indicator 36 remain in their present condition. Movement of the aircraft with respect to the ground, however, changes the delay of video signal V, to changed the overlap area to some other value $A_1$ or $A_2$, and a signal to comparator 31 changes so that an "up" or "down" output is supplied to logic 33 and cause operation of counter 34 to adjust delay line 24 in a sense to change the area toward the area A.

From the above it will be evident that the invention comprises apparatus employing pseudo random pulse coding to enable increased pulse repetition frequency in a radar system without introduction of an ambiguity into the signals. It will be evident that the arrangement has a high tolerance to interference, either intentional or incidental, since any interfering signal must comprise pulses having the particular pseudo random (PRN) coding in order to appreciably affect the apparatus. The synchronizing apparatus of the present invention has been illustrated by use of a radar altimeter. Numerous characteristics and advantages of the invention have been set forth in the foregoing description, together with details of the structure and function of the invention. However, the synchronizing apparatus of the present invention may be employed where it is necessary to synchronize two pulse trains separated in time by an unknown condition and synchronized with or derived from a common clock signal or pulse train. Nevertheless, changes may be made in detail especially in matters of shape, size, and arrangement of parts, within the principals of the invention, to the full extent indicated by the broad general meaning of the terms in which the appended claims are expressed. Specifically, a phase shifter or a shift register may be substituted for programmable delay line 24. Since the output of programmable delay line provides a second clock signal delay with respect to the first clock signal, from which both of these derive subsequent pulse trains for comparison and synchronization, there are many ways to provide such delay. A common shift register is one such technique for providing a programmable delay line. Another example is a discreet phase shifter also responsive to the output of counter 34 for monotonically changing the phase or delay of a second clock signal relative to the first clock signal.

The embodiments of the invention in which an exclusive property or right is claimed are defined as follows:

1. A radar apparatus comprising:
   means for providing a continuous first train of pulses having a predetermined repetition frequency;
   first coding means for deriving from said first train of pulses a first digital signal having a repetitive first binary code;
   means for transmitting radar pulses having a selected time duration and synchronized with each occurrence of a first state of said first digital signal;
   means for receiving radar signals and producing a video signal including components representative of returned radar pulses delayed relative to said transmitted radar pulses;
   signal means for providing a second digital signal having said first binary coding;
   control means for providing a command signal as a function of said video signal in which the relative polarity of said video signal is (i) non-inverted during time intervals synchronized with a first state of said second digital signal, and (ii) inverted during time intervals synchronized with a second state of said second digital signal; and
   said signal means including delay means for variably delaying said second digital signal in response to said command signal to bring said second digital signal into synchronism with said returned radar pulses.

2. The apparatus of claim 1 wherein said first binary code is a pseudo random code.

3. The apparatus of claim 2 wherein said control means further includes means for providing the function of integrating said video signal.

4. The apparatus of claim 2 wherein:
   said delay means includes means responsive to said decision control signal for selectively advancing, retarding, and maintaining the position of said second digital signal, in time, relative to said returned radar pulses.

5. The apparatus of claim 4 wherein said delay means further comprises:
   up/down counter means having input means for selectively enabling an up-count mode, a down-count mode and inhibit mode, said counter having a digital count output; and
   a digital programmable control means responsive to said digital count for selectively advancing and retarding by monotonic increments said second digital signal relative to said returned radar pulses.

6. The apparatus of claim 5 further comprising:
   means for providing a first clock signal at a first frequency, wherein said first pulse train is derived from said first clock signal;
   said programmable control means further including, means for providing a second clock signal derived from said first clock signal, said second clock signal being substantially identical to said first clock signal but which is delayed in time in accordance with said command signal; and
   said second signal means includes a second coding means for deriving from said second clock signal said second digital signal.

7. An apparatus comprising:
   means for providing a first clock signal at a first frequency;
   first divider means for dividing said first clock signal by N thereby generating a first pulse train;
   first coding means for deriving from said first pulse train a second pulse train having a repetitive code;
   delay means responsive to a command signal for providing a second clock signal derived from said first clock signal, said second clock signal being substantially identical to said first clock signal but which is delayed in time in accordance with said command signal;
   a second divider means for dividing said second clock signal by N thereby generating a third pulse train substantially identical to said first pulse train but which is delayed with respect thereto;
   second coding means for deriving from said third pulse train a fourth pulse train having said repetitive code;
   means for receiving a fifth pulse train having pulses in relation to pulses of said second pulse train which said pulses of said fifth pulse train are delayed relative to said second pulse train in accordance with an unknown time delay;
   gating means connected to receive said fifth pulse train and actuated in synchronisms with said fourth pulse train to gate through said gating means said fifth pulse train in opposite senses in accordance with a condition of said fourth pulse train; and
   control means for providing said command signal in accordance with a function of said transmitted fifth pulse train through said gating means, said control means operative to selectively advance and retard said fourth pulse train with respect to said first pulse train to bring said fourth pulse train in synchronism with said fifth pulse train.

8. The apparatus of claim 7 wherein said delay means further comprises:
   up/down counter means having input means for selectively enabling an up-count mode, a down-count mode and inhibit mode, said counter having a digital count output; and
   a digital programmable control means responsive to said digital count for selectively advancing and retarding by monotonic increments said second clock signal relative to said first clock signal.

9. The apparatus of claim 7 wherein said repetitive code is a pseudo random code.

10. The apparatus of claim 9 wherein said control means further includes means for providing the function of integrating said fifth pulse train transmitted through said gating means.

11. The apparatus of claim 9 wherein:
said delay means includes means responsive to said command signal for selectively advancing, retarding, and maintaining the position of said second clock signal, in time, relative to said first clock signal.

12. A radar apparatus comprising:
means for providing a continuous first train of pulses having a predetermined repetition frequency;
first coding means for deriving from said first train of pulses a first digital signal having a repetitive first binary code;
means for transmitting radar pulses having a selected time duration and synchronized with each occurrence of a first state of said first digital signal;
means for receiving radar signals and producing a video signal including components representative of returned radar pulses delayed relative to said transmitted radar pulses;
signal means for deriving from said first train of pulses a second digital signal having said first binary coding;
control means for providing a command signal as a function of the integration of said video signal in which the relative polarity of said video signal is (i) non-inverted during selected time intervals synchronized with a first state of said second digital signal, and (ii) inverted during selected time intervals synchronized with a second state of said second digital signal; and
said signal means including delay means for variably delaying said second digital signal in response to said command signal to bring said second digital signal into synchronism with said returned radar pulses.

13. The apparatus of claim 12 wherein:
said delay means includes means for deriving a continuous second train of pulses derived from said clock signal, said delay means being operative to selectively advance, retard, and maintain said second train of pulses relative to said first train of pulses to bring into synchronism the position of said second digital signal, in time, into synchronism with said returned radar pulses.

14. The apparatus of claim 13 wherein said control means includes means for integrating said video signal in which said video signal is selectively caused to be (i) inverted and (ii) non-inverted in accordance with a selected condition of said second digital signal.

* * * * *

UNITED STATES PATENT AND TRADEMARK OFFICE
CERTIFICATE OF CORRECTION

PATENT NO. : 4,816,834

DATED : March 28, 1989

INVENTOR(S) : MERLIN D. BJORKE and BAARD H. THUE

It is certified that error appears in the above-identified patent and that said Letters Patent is hereby corrected as shown below:

On the title page,
  item [75] Inventor:   Add Baard H. Thue, Lino Lakes, Minn.

Signed and Sealed this

Thirty-first Day of October, 1989

*Attest:*

DONALD J. QUIGG

*Attesting Officer*    *Commissioner of Patents and Trademarks*